United States Patent
Moore et al.

[11] 3,858,037
[45] Dec. 31, 1974

[54] WELL-LOGGING MEASURING APPARATUS AND METHOD

[75] Inventors: Donald C. Moore, Ridgefield; Jay Tittman, Danbury, both of Conn.

[73] Assignee: Schlumberger Technology Corporation, Houston, Tex.

[22] Filed: Jan. 18, 1973

[21] Appl. No.: 324,619

Related U.S. Application Data

[60] Continuation of Ser. No. 48,641, Jan. 18, 1973, abandoned, which is a division of Ser. No. 716,456, March 27, 1968, abandoned.

[52] U.S. Cl............ 235/193, 235/151.35, 250/256, 250/272
[51] Int. Cl. .............................................. G01t 1/16
[58] Field of Search............ 235/193, 151.3, 151.35; 324/.56, .5 A, 1, 77 B; 250/252, 253, 256, 261, 262, 263, 264, 265, 266, 267, 272, 336, 83.6 W, 83.3, 71.5 R

[56] References Cited
UNITED STATES PATENTS

| | | |
|---|---|---|
| 3,108,188 | 10/1963 | Dewan et al. ............. 250/83.6 W X |
| 3,139,528 | 6/1964 | Johnson ..................... 250/83.6 W X |
| 3,368,075 | 2/1968 | Reed et al. ................. 250/83.6 W X |
| 3,435,217 | 3/1969 | Givens ...................... 250/83.6 W X |
| 3,465,151 | 9/1969 | Youmans ....................... 250/83.6 W |
| 3,514,598 | 5/1070 | Youmans .................. 250/83.6 W X |
| 3,521,064 | 7/1970 | Moran et al. ............. 250/83.6 W X |
| 3,532,885 | 10/1970 | Youmans et al. ......... 250/83.6 W X |

*Primary Examiner*—Joseph F. Ruggiero

[57] ABSTRACT

A specific embodiment of the invention provides a technique for identifying the mineral composition of an earth formation masked by a barite mudcake. The gamma radiation intensities on both sides of the K absorption limit for the barium in the mudcake are contracted with a normalized gamma radiation spectrum of the formation. The contrast indicates the nature of the mineral composition and some characteristics of the mudcake.

18 Claims, 7 Drawing Figures

CROSS PLOT
SOFT-HARD RATIO VS PEAK-VALLEY RATIO

INVENTORS
Donald C. Moore
Jay Tittman
BY John P. Sinnott
ATTORNEY

PULSE HEIGHT SPECTRUM FROM QUARTZ AND FROM CALCITE, CESIUM SOURCE, 12 IN. SOURCE-TO-DETECTOR DISTANCE, NO MUDCAKE

PULSE HEIGHT SPECTRUM FROM QUARTZ AND FROM CALCITE, CESIUM SOURCE, 12 IN. SOURCE-TO-DETECTOR DISTANCE, 1/4 INCH MUDCAKE

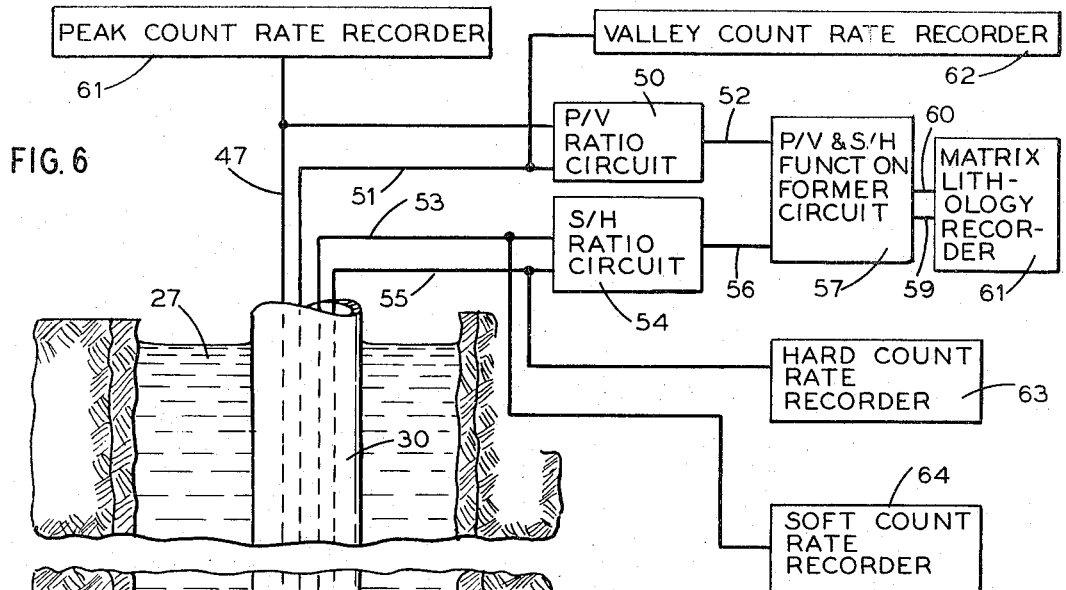
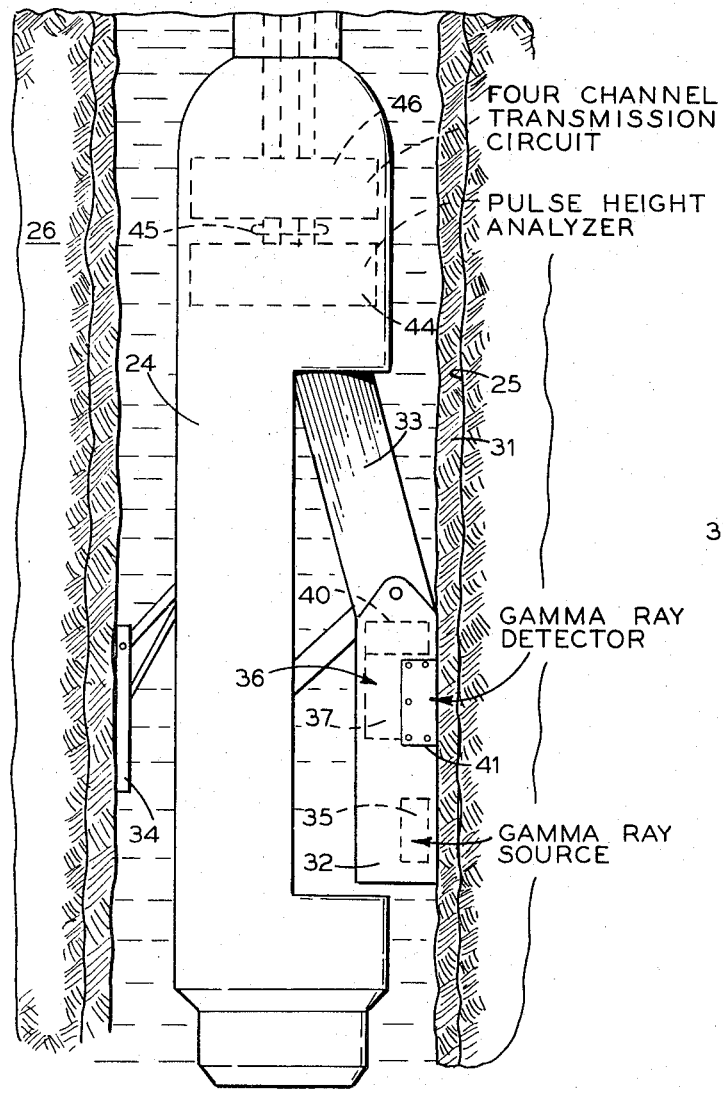
FIG. 6
FIG. 7

WELL-LOGGING MEASURING APPARATUS AND METHOD

This is a continuation of application Ser. No. 48,641 filed June 8, 1970, which is in turn a division of application Ser. No. 716,456 filed Mar. 27, 1968, both now abandoned.

This invention relates to well logging techniques, and more particularly, to novel methods and apparatus for identifying the nature of the earth formations surrounding a borehole with the aid of nuclear phenomena and the like.

Frequently, the presence of oil in an earth formation cannot be determined without detailed knowledge of the formation characteristics. Formation density and mineral composition are typical of the kind of data needed for this sort of a determination. Various drilling techniques, however, often introduce factors that make direct measurement of these formation parameters quite difficult.

For example, many boreholes are filled with a barite (barium sulfate, $BaSO_4$) mud. The mud column overcomes high pressure in the borehole and, during drilling, lubricates the drill bit and flushes the drill cuttings out of the borehole. The fluids in the mud, however, often seep into or "invade" the surrounding formation and deposit a residue or "mudcake" on the borehole walls. This mudcake, which may vary from a negligibly thin film to a coat one half of an inch or more in thickness, tenaciously adheres to the borehole walls and interposes a layer of matter between a logging tool within the borehole and the formation under investigation.

Logging tools, however, have been suggested in the prior art for measuring formation density in the presence of mudcake. These proposed tools observe only those gamma rays emitted from the tool and scattered through the formation that retain energies in excess of about 50,000 electron volts (50 keV). Gamma rays of lower energies are filtered out or electronically removed because they are affected by the chemical nature of the formation and mudcake, if a mudcake is present, as well as by the formation density.

It has been proposed, however, to use these low-energy gamma rays to assay ores for concentrations of iron and other heavy elements. These proposals are usually limited in application to materials that have atomic numbers (Z), or relative positions in the periodic table of the elements, that are equal to or greater than $Z = 26$ (the atomic number of iron). According to one of these proposals, the formation is irradiated with gamma rays and a ratio is taken of the intensity of the gamma rays retaining energies greater than 400 keV to the intensity of the gamma rays that have energies less than 400 keV. This ratio provides a reasonably accurate indication of the relative concentration of a heavy element that was known to have been present in the formation.

The physical principles of low energy gamma ray absorption were thought to debar this sort of an approach from application to formation analysis for oil exploration purposes. Thus, some collisions between gamma rays and the most lightly bound electrons in the orbits about atomic nuclei, where the gamma ray energy generally is below 100 keV, result in an absorption of the colliding gamma rays, or photons. This phenomenon is called the photoelectric effect. Because the coefficient for photoelectric absorption in barium for gamma rays of 37 keV or more is very high, the barite mudcake distorts the gamma ray spectrum that otherwise would characterize the formation undergoing irradiation. For example, to distinguish limestone from quartz, photon intensity in the energy range of about 40 keV to 100 keV are of particular significance.. Barium, however, very strongly absorbs photons with energies less than about 60 keV. Consequently, it did not seem technically possible to distinguish limestone from quartz in the presence of a barite mudcake because barium was believed to obliterate the most important part of the spectrum.

Nevertheless, there is a need for a technique that will identify potential oil-bearing formations with accuracy.

Thus, it is an object of the invention to identify the structure of an earth formation.

It is another object of the invention to overcome the influence of mudcake on a gamma ray spectrum that characterizes the mineral composition of an earth formation.

It has been found that the barium in the mudcake does not absorb all of the incident photons with energies less than 60 keV. Photon absorption increases very rapidly as the photon energies decrease to 37 keV, which is the minimum energy required to eject an electron from the innermost, or "K shell," orbit around a barium nucleus. For photon energies just below the K shell electron binding energy, however, the absorption coefficient decreases by a factor of about six. This drop in photon attenuation provides a channel for transmitting through the mudcake photons that have energies just below the K absorption edge. Consequently, as the photons decrease in energy, the photon intensity approaches a minimum or "valley" at the K absorption limit. A photon intensity "peak," of transmission maximum, occurs at energies immediately below the K limit. Barium fluorescence x-rays may also contribute to this peak.

In accordance with the invention, this unexpected photon intensity valley at the K absorption edge, and peak immediately below, provide a satisfactory basis for identifying the mineral composition of the formation and the character of the mudcake.

More particularly, one embodiment of the invention provides a tool for passage through a borehole that has a gamma ray source for irradiating the adjacent earth formations. A gamma ray detector within the tool registers the intensities of the gamma rays scattered back to the detector by the formation through a spectrum of energies that extends from about 20 keV to about 300 keV.

Signals corresponding to photon intensity and energy through a spectrum from about 24 keV to 300 keV are transmitted from the tool to the earth's surface. Circuit means are provided for separating the spectrum signals into energy groups. For illustrative purposes, four groups will be described. These correspond to the photon intensity peak (about 24 keV to about 33 keV), the photon intensity valley (about 39 keV to about 51 keV, the "soft" photon intensity (about 39 keV to about 120 keV) and the "hard" photon intensity (about 240 keV to about 300 keV). The mudcake characteristics can be identified by contrasting the peak to valley photon intensities. The spectrum is "normalized" to remove formation density effects and then compared with the peak to valley relationship to indicate the mineral composition of the formation. The spectrum may be normalized, or conformed to a standard for analysis, in one embodiment of the invention, by dividing the soft photon intensity by the intensity of the hard photons.

To prevent the iron in the tool housing from distorting the gamma ray spectrum observed by the detector, a window of a suitable material that has a low effective atomic number, such as beryllium, is placed in the housing between the detector and the formation.

The principles of this invention are by no means limited to oil exploration techniques, but have application to any geophysical investigation in which the nature of the mineral structure is important, Accordingly, the novel features of the present invention are set forth with particularity in the appended claims. The present invention, both as to its organization and manner of operation, together with further objects and advantages thereof, may best be understood by reference to the following description taken in conjunction with the accompanying drawings in which:

FIG. 6 is a schematic diagram of a typical apparatus for practising the invention, showing the electrical circuits associated therewith in block diagram form; and FIG. 7 is an enlarged view of another embodiment of a portion of the apparatus shown in FIG. 6.

Figure 1:
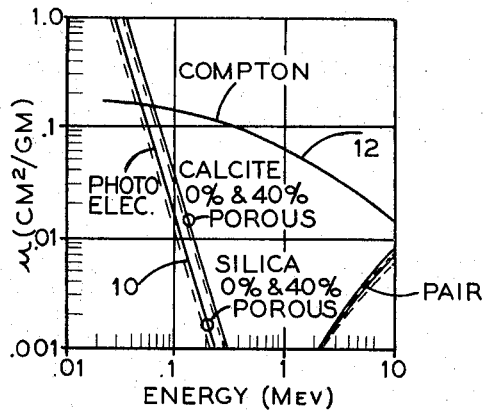
FIG. 1 is a representative logarithmic graph of photon absorption as a function of photon energy.

For a more complete understanding of the invention, FIG. 1 shows typical graphs of absorption coefficients for gamma rays in solid matter. At photon energies less than about 100 keV, photoelectric absorption in silica, for example, as indicated by curve 10, dominates the gamma ray absorption phenomena. The ascendant interaction mechanism for photons that have energies greater than about 100 keV is the Compton effect, curve 12, which provides, in well logging applications, a measure of earth formation density.

Figure 2:
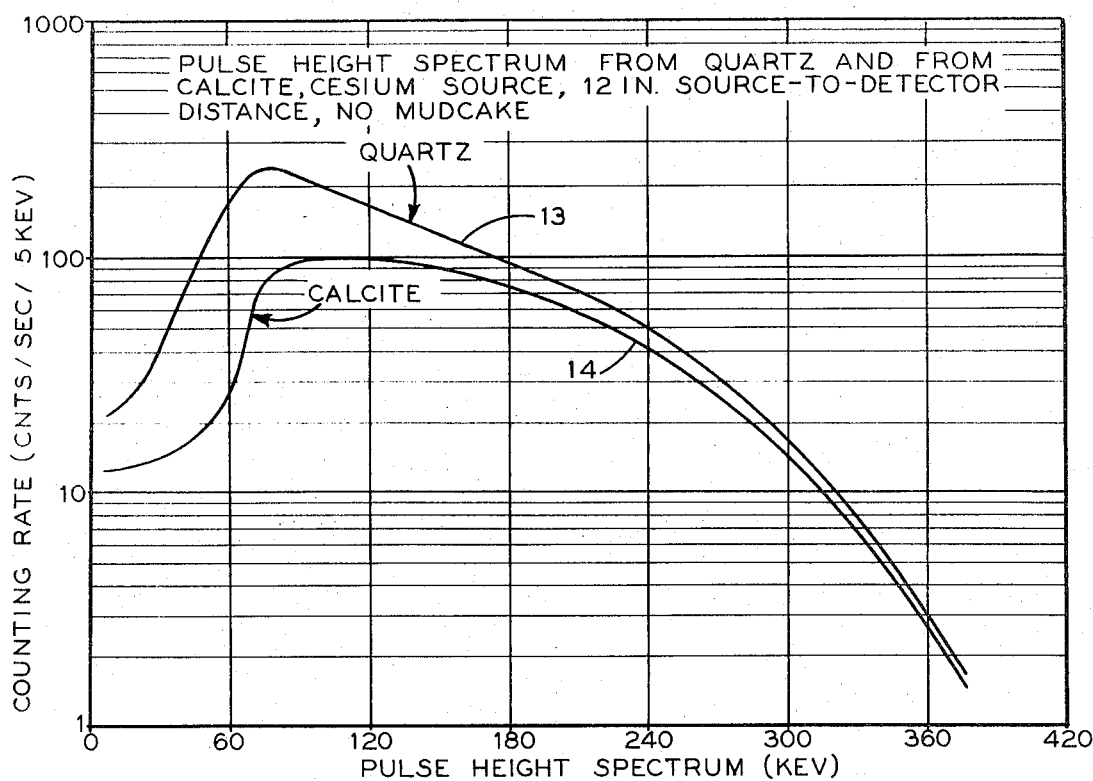
FIG. 2 is a graph showing scattered photon intensities as a function of energy in quartz and calcite.

Because the binding energies which hold electrons in the appropriate orbits about the nucleus generally are different for each element, photoelectric absorption can produce a distinct spectrum that identifies the chemical composition of the attenuating material. In FIG. 2, pulse height spectra, or photon intensities as a function or photon energies, are shown for gamma radiation that has penetrated a sufficient depth of the irradiated material to reach an equilibrium condition. In equilibrium, the shapes of the quartz and calcite curves 13 and 14, respectively, remain substantially the same at successive, greater distances from the gamma ray source. The pulse height intensity peaks at approximately 100 keV for calcite and 75 keV for quartz are particularly significant for the purpose of distinguishing these two minerals from each other. Moreover, the quartz and calcite curves above about 240 keV are generally parallel and do not show any individually distinguishing characteristics. consequently, mineral identification must rely on a low energy gamma ray interpretation technique.

The relatively greater attenuation of low energy photons in calcite relative to quartz as shown by a comparison of curves 14 and 13, arises from the difference in effective atomic numbers ($Z_{eff}$) for calcite (15.7) and quartz (11.8). Thus, in general, photoelectric absorption coefficients increase with the effective atomic number of the irradiated substance. The effective atomic number is a weighted average of the atomic numbers of all of the constituent elements in the mineral under consideration.

Because the atomic number of barium is 56, a borehole lined with a barite mudcake (FIG. 3) absorbs low energy gamma rays scattered back from the formation to the borehole, and tends to destroy the distinctive spectral characteristics that identify quartz and calcite. The pulse height spectrum for quartz 15 and for calcite 16 transmitted through a 1/4 inch thick barite mudcake does not show the characteristic gamma ray intensities at 100 keV and 75 keV that so clearly distinguishes these minerals in FIG. 2.

Figure 3:
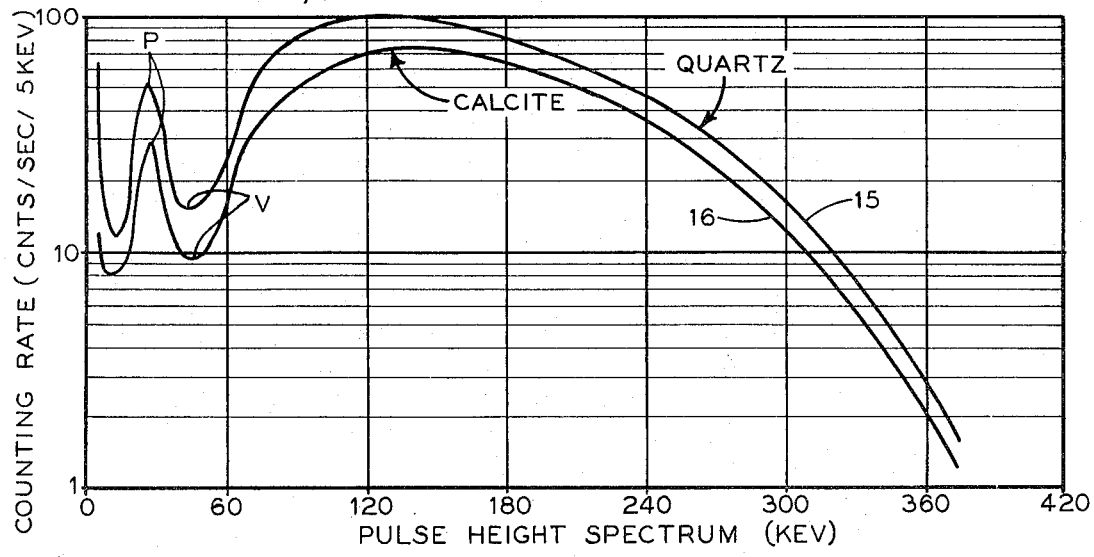
FIG. 3 is a graph showing photon intensities in quartz and calcite in the presence of a barite mudcake.
Figure 4:
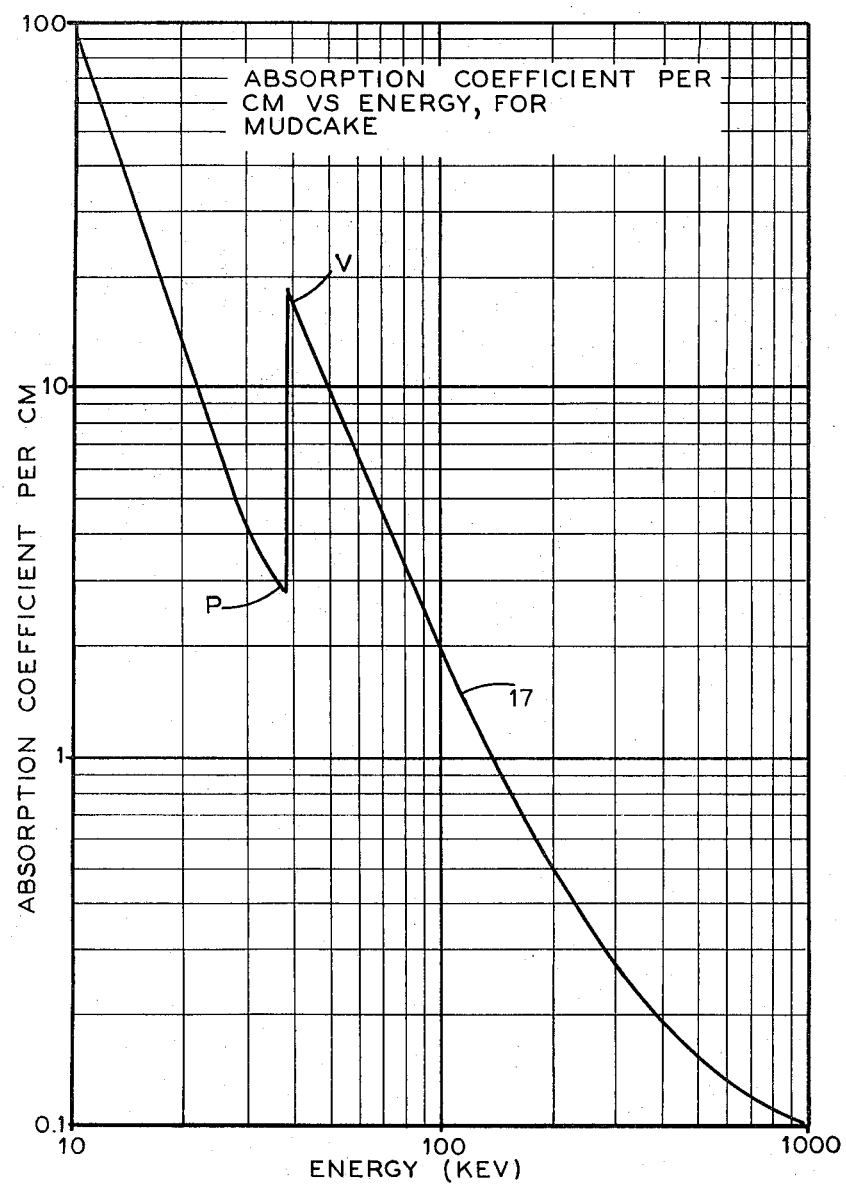
FIG. 4 is a graph of gamma ray absorption coefficients in a barite mudcake.

The degradation in the information content of the curves 15 and 16 caused by the barite mudcake is best understood through an examination of FIG. 4. As the energies of the photons transmitted through the mudcake decrease, the photon absorption coefficient increases rapidly to a sharply defined edge V on curve 17 at about 37 keV, which is the binding energy of the barium K shell electrons. Photon energies immediately less than the binding energy of the barium K shell electrons are subjected to a much lower absorption coefficient. This dramatically reduced absorption coefficient establishes a channel for transmitting these lower energy photons through the barite mudcake and produces the photon intensity peaks P on curves 15 and 16 in FIG. 3. There is some evidence that K x-ray fluorescence also contributes to this peak.

Figure 5:
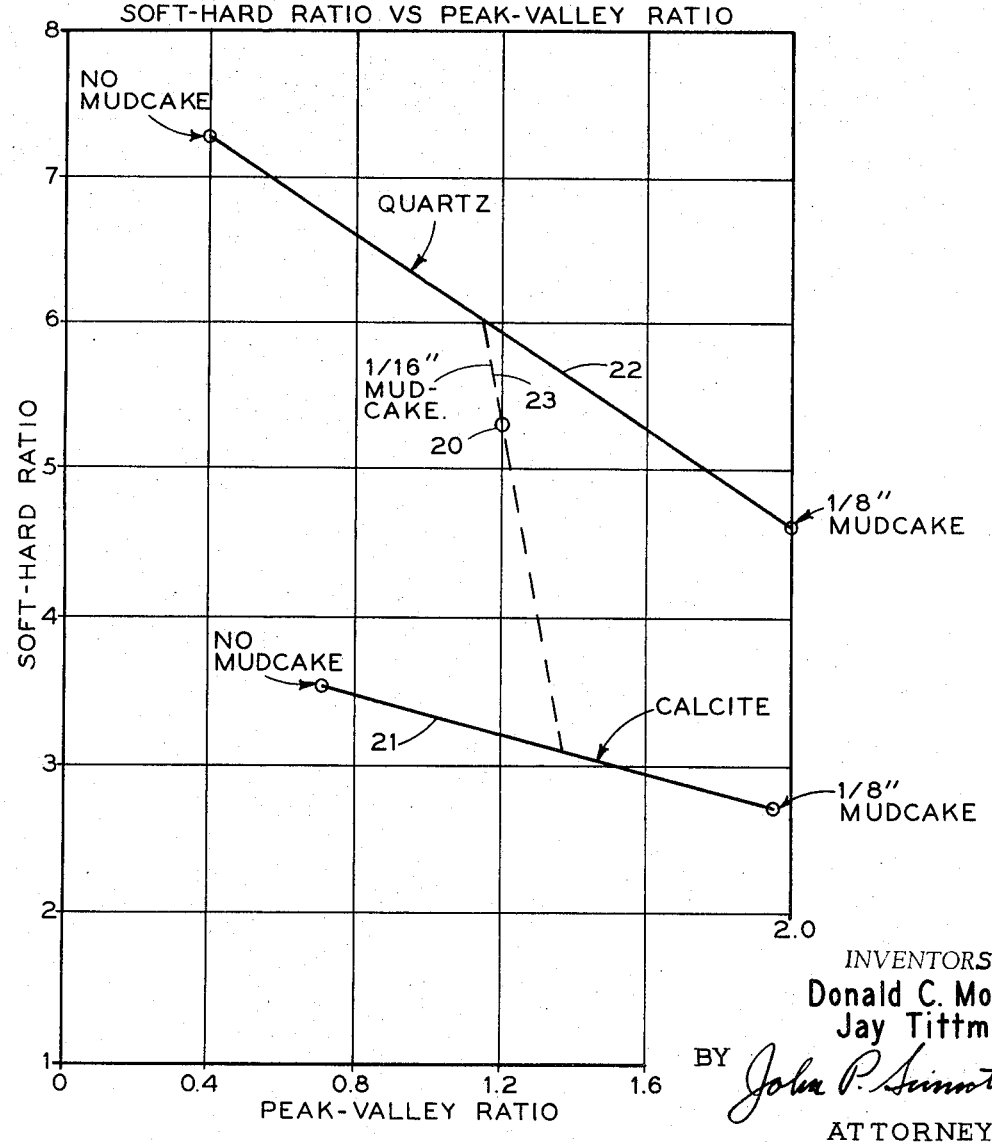
FIG. 5 is one kind of graph which can be used in accordance with the invention for combining the photon transmission characteristics of quartz and calcite in the presence of mudcakes of different thicknesses.

In accordance with one aspect of the invention, a quantitative measure of the barite mudcake is developed by contrasting the photon intensity at the barium k transmission peak, P, to the photon intensity in the attenuation valley V. More specifically, the peak pulse intensity or counting rate in the energy range from about 24 keV to about 33 keV is divided by the valley counting rate in the energy range from about 39 keV to about 51 keV to produce a "peak-to-valley" ratio that increases in magnitude with increasing mudcake thickness. As shown in FIG. 5, a peak-to-valley ratio of about 0.6 corresponds to a negligibly thin mudcake film, and a ratio of about 2.0 indicates that the mudcake is 1/8 of an inch thick for a specific barium concentration. Ratios greater than 2.0 would be indicative of even thicker mudcakes.

Having measured the influence of the mudcake, the photon spectrum shown in FIG. 3 can be normalized to eliminate formation density effects and enable the mineral composition of the formation to be identified. This aspect of the invention is accomplished, in the embodiment of the invention under consideration, by computing a ratio of the counting rate in the soft gamma ray energy range from about 39 keV to 120 keV to the counting rate in the hard gamma ray energy range from about 240 keV to 300 keV. This soft-to-hard ratio is combined with the peak-to-valley ratio by entering the graph in FIG. 5. For example, if the peak-to-valley ratio is 1.2 and the soft-to-hard ratio is 5.3, a point 20 is identified between the curves for calcite 21 and quartz 22. The relative position of the point 20, about 85 percent of the distance from the calcite curve 21 on a line of constant mudcake thickness of 1/16 of an inch indicates that the formation is a "mixed lithology" containing predominantly quartz and a minor concentration of calcite.

An exemplary tool for identifying the mineral composition of an earth formation and mudcake characteristics in accordance with the principles of the invention is shown in FIGS. 6 and 7.

The tool comprises a fluid-tight pressure resistant housing 24 adapted to pass through a borehole 25 that traverses earth formation 26. The borehole 25 may be dry or may be filled with water-base or oil-base drilling mud 27 as shown. Housing 24 is suspended in the borehole 25 by an armored cable 30 which may contain a group of insulated conductors for transmitting signals to the earth's surface. A winch (not shown) located at the surface of the earth is used to lower and raise the housing in the borehole in the customary manner to traverse the earth formations 26.

Borehole 25 may be lined with a mudcake 31 which usually forms in uncased boreholes when the liquids in the drilling mud invade the earth formations 26 surrounding the borehole 25 and deposit a residue of solid matter on the borehole walls.

To reduce the influence of borehole variations on the gamma radiation measurements, a skid 32, which forms a portion of the housing 24, is biased against the mudcake 31 and the adjoining portion of the borehole wall by a decentralizing linkage 33 which is controlled from the earth's surface. The skid 32 is urged against the mudcake 31 and the borehole 25 by a backup skid 34 which is pivotally connected to housing 24 on a portion thereof that is diametrically opposite to the skid 32.

The skid 32 contains a gamma ray source 35, which preferably may be cesium 137 ($Cs^{137}$). Gamma ray photons emitted by the source 35 diffuse through the adjacent portion of the formation 26 where the energy of the individual photons is degraded by Compton scattering with the formation constituents. Some of these photons diffuse back toward the skid 32 and are registered by a gamma ray detector 36.

The detector 36 may be, for example, a semiconductor detector or as shown in FIG. 6, a scintillator crystal 37 vertically spaced about 12 inches from the effective center of the source 35 and optically coupled to a photomultiplier tube 40. Gamma ray photons incident on the crystal 37 produce flashes of light therein, the intensities of which are related to the energies of the individual photons. These flashes of light are transmitted through the crystal to the photomultiplier tube 40 which emits an electrical charge pulse that has an amplitude proportional to the intensity of the light flash and, hence, is related to the photon energy.

Because of arduous service conditions, the housing 24 and the skid 32 usually are made of steel or some similar material of high atomic number. The iron in the skid 36, however, obliterates the characteristics of the soft portion of the gamma ray spectrum scattered back to the detector 37 in the same way as the barite mudcake 31. In order to overcome the influencne of the iron on the spectrum, a soft gamma ray window 41 formed of a material that is substantially transparent to photons in the energy range above about 20 keV is secured by fasteners or the like in an aperture in the skid 32. The window 41 is interposed between the scintillator crystal 37 and the adjoining portion of the mudcake 31 and preserves the pressure-tight integrity of the skid 32.

Because the characteristics of the low energy portion of the spectrum are determined largely by the atomic number of the irradiated material, the window 41 must have an appreciably lower effective atomic number than ordinary earth formation materials. Thus, magnesium ($Z=12$), aluminum ($Z=13$) and silicon ($Z=14$) are common mineral constituents. Accordingly, suitable window materials that would not dominate or obliterate spectra identifying these elements should have an effective atomic number significantly less than 11. In view of this, window materials must be selected from the elements, or a composition of the elements, in the periodic group from hydrogen ($Z=1$) to sodium ($Z=11$). Typical window choices in accordance with the invention would be beryllium or reinforced solid hydrocarbon.

Another embodiment of a soft gamma ray window is shown in FIG. 7. A group of small inwardly converging apertures 42 is formed in the steel housing 24 between the mudcake 31 and the scintillator crystal 37. The apertures 42 are filled completely with a suitable pressure resistant material 43, such as hydrocarbon plastic or beryllium, that is transparent to low energy photons.

Turning once more to FIG. 6, signals from the gamma ray detector 36 that correspond to the energies of the detected gamma rays are received by a pulse height analyzer 44. The pulse height analyzer 44 segregates the signals from the detecto, 36 into, for example, four groups. The lowest energy gamma ray group corresponds to the peak photon intensity energy range from approximately 24 keV to 33 keV. The pulse height analyzer 44 establishes a second group of detector signals for the photon intensity valley in the energy range from approximately 39 keV to 51 keV. Detector signals that correspond to the intensities of the hard and soft spectral energies also are separated by the pulse height analyzer 44. These latter signal groups correspond to the soft energy range of about 39 keV to 120 keV and the hard energy range from about 240 keV to 300 keV.

Signals in each of these four groups are transmitted through individual leads in a trunk 45 to a four channel transmission circuit 46 in the housing 24. The transmission circuit 46 sends signals that correspond to the gamma ray intensities or counting rates in each of the four groups through conductors in the armored cable 30 to the earth's surface.

The peak counting rate signal is transmitted through conductor 47 to a peak-to-valley ratio circuit 50. The valley counting rate signal is transmitted through conductor 51 also to the ratio circuit 50. The circuit 50 contrasts the peak and valley signals by producing an output signal in conductor 52 that corresponds to the ratio of the peak-to-valley counting rates.

In a similar manner the soft counting rate signal and the hard counting rate signal are transmitted through conductors 53 and 55, respectively, to soft-to-hard ratio circuit 54. The ratio circuit 54 provides a specific technique for normalizing the detected spectrum in order to eliminate density effects by establishing a signal in output conductor 56 that corresponds to the ratio of the soft-to-hard counting rates.

A peak-to-valley and soft-to-hard ratio function former circuit 57 combines the ratio signals in conductor 52 with the normalized spectrum signal in conductor 56 according to the relation between these signals shown in FIG. 5. The function former circuit 57 preferably takes the form of an operational amplifier having a resistor-diode network connected into the feedback circuit thereof. The circuit parameters and biasing of the function former circuit 57 are chosen to establish an output signal appropriate to the magnitude of the input ratio signals in accordance with the characteristics of the FIG. 5 graph.

Output signals from function former circuit 57 are transmitted through conductors 59 and 60 to a matrix lithology recorder 61 which conveniently may be a recording galvanometer that produces curves of formation chemical composition, or $Z_{eff}$, and mudcake correction, $\Delta Z_{eff}$, as a function of borehole depth.

The individual peak, valley, hard and soft counting rates may be registered directly in recorders 61, 62, 63 and 64, respectively. This presentation of the basic counting rate information enables the operation of the ratio circuits 50 and 54 and the function former circuit 57 to be checked occasionally through a manual computation.

Alternatively, it has been found that the aforementioned peak-to-valley ratio, when combined in the foregoing manner with a peak-to-hard or a valley-to-hard ratio signal, also produces a satisfactory barite mudcake correction for mineral identification. The tool, moreover, need not respond only to gamma radiation of 300 keV or less, but may transmit signals that correspond to higher gamma ray energies as well. These higher energies in the broader spectrum are analyzed further to indicate the density of the formation 26 as described in more complete detail in U.S. Pat. No. 3,263,083, issued on July 26, 1966 to F. F. Johnson et al, U.S. Pat. No. 3,321,625, issued to John S. Wahl on May 23, 1967, and U.S. Pat. No. 3,321,627, issued to Charles W. Tittle on May 23, 1967, all of which are assigned to the assignee of the invention described herein.

While particular embodiments of the present invention have been shown and described, it is apparent that changes and modifications may be made without departing from this invention in its broader aspects, and, therefore, the aim in the appended claims is to cover all such changes and modifications as full within the true spirit and scope of the invention.

What is claimed is:

1. A computer for analyzing characteristics of an earth formation traversed by a borehole wherein measurements for use by said computer are derived from a logging tool adapted to pass through a borehole while emitting gamma radiation into and detecting gamma radiation from a formation, comprising a first source of signals corresponding to detected gamma radiation and representative of detected photons of energies within a predetermined range which is less than about 33 keV and substantially greater than 0 keV, a second source of signals corresponding to detected gamma radiation and representative of detected photons of energies greater than about 39 keV, and circuit means for combining signals from said sources to produce a first output signal representative of a subsurface characteristic.

2. A computer according to claim 1 and further including discriminator means responsive to said second source signals for producing a first group of signals that correspond to photon energies from about 39 keV to about 120 keV and a second group of signals that correspond to photon energies from about 240 keV to about 300 keV, and further circuit means for combining said first and second groups of signals to produce a second output signal for use with said first output signal for identifying characteristics of an earth formation.

3. A computer according to claim 1 wherein said first output signal is indicative of a mudcake on the wall of a borehole.

4. A computer according to claim 1 wherein said first source signals corresponds to photons of energies in the range of about 24 keV to about 33 keV and said second source signals correspond to photons of energies in the range of about 39 keV to 51 keV.

5. A computer according to claim 4 wherein said signals from said first and second sources are combined in accordance with a predetermined relationship to produce said first output signal, which first output signal is indicative of barite mudcake on the wall of a borehole.

6. A computer according to claim 2 and further including means for combining said first and second output signals to produce a signal representative of given characteristics of an earth formation.

7. A computer according to claim 5 wherein said predetermined relationship is the ratio of said first and second source signals to one another.

8. A computer according to claim 1 and further including discriminator means responsive to said second source signals for producing a first group of signals representative of a specified energy range for use with said first output signal in identifying characteristics of an earth formation.

9. A method of analyzing characteristics of an earth formation traversed by a borehole from measurements derived from a logging tool adapted to pass through a borehole while emitting gamma radiation into and detecting gamma radiation from a formation, comprising deriving first measurements corresponding to detected gamma radiation and representative of detected photons of energies less than about 33 keV, deriving second measurements corresponding to detected gamma radiation and representative of detected photons of energies within at least one predetermined range greater than about 39 keV, combining said first and second measurements to produce a first output representative of a subsurface characteristic.

10. The method of claim 9 and further including selecting only those of said second measurements which correspond to photon energies from about 39 keV to about 120 keV to produce a first group of measurements, and selecting only those of said second measurements which correspond to photon energies from about 240 keV to about 300 keV to produce a second group of measurements, and combining said first and second groups of measurements to produce a second output for use with said first output for identifying characteristics of an earth formation.

11. The method of claim 9 wherein said first output is indicative of a mudcake on the wall of said borehole.

12. The method of claim 9 wherein said first measurements correspond to photons of energies in the range of about 24 keV to about 33 keV and said second measurements correspond to photons of energies in the range of about 39 keV to 51 keV.

13. The method of claim 12 wherein said first and second measurements are combined in accordance with a predetermined relationship to produce said first output, which first output is indicative of mudcake on the wall of a borehole.

14. The method of claim 10 and further including combining said first and second outputs to produce a representation of given characteristics of an earth formation.

15. The method of claim 13 wherein said predetermined relationship is the ratio of representations of said first and second measurements to one another.

16. The method of claim 9 and further including selecting those of said second measurements within a specified energy range for use with said first output in identifying characteristics of an earth formation.

17. The method of claim 13 wherein said first output is indicative of mudcake thickness.

18. The method of claim 13 and further including the steps of selecting those of said second measurements which correspond to photon energies from about 39 keV to about 120 keV to produce third measurement representations, selecting those of said second measurements which correspond to photon energies from about 240 keV to 300 keV to produce fourth measurement representations, combining said third and fourth measurement representations to produce a second output, and combining said first and second outputs to produce an output representation of the constituents of the earth formation.

* * * * *